US 8,176,007 B2

(12) United States Patent
Hoang et al.

(10) Patent No.: US 8,176,007 B2
(45) Date of Patent: May 8, 2012

(54) PERFORMING AN ACTION IN RESPONSE TO A FILE SYSTEM EVENT

(75) Inventors: Thuvan Hoang, Santa Clara, CA (US); Sam Idicula, San Jose, CA (US); Nipun Agarwal, Santa Clara, CA (US); Ravi Murthy, Fremont, CA (US); Asha Tarachandani, Newark, CA (US); Namit Jain, San Jose, CA (US); Eric Sedlar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/026,131

(22) Filed: Feb. 11, 2011

(65) Prior Publication Data

US 2011/0137963 A1 Jun. 9, 2011

Related U.S. Application Data

(63) Continuation of application No. 11/014,502, filed on Dec. 15, 2004, now Pat. No. 7,921,076.

(51) Int. Cl.
*G06F 7/00* (2006.01)
(52) U.S. Cl. .................. 707/609; 707/760; 707/770
(58) Field of Classification Search .................. None
See application file for complete search history.

(56) References Cited

U.S. PATENT DOCUMENTS

| 4,558,413 A | 12/1985 | Schmidt et al. |
| 5,047,918 A | 9/1991 | Schwartz et al. |
| 5,202,982 A | 4/1993 | Gramdlich et al. |
| 5,210,686 A | 5/1993 | Jernigan |
| 5,222,242 A | 6/1993 | Choi et al. |
| 5,257,366 A | 10/1993 | Adair et al. |

(Continued)

FOREIGN PATENT DOCUMENTS

EP 856803 A2 8/1998

(Continued)

OTHER PUBLICATIONS

"Power Schemas with Styles Studio," Whitepaper published by Sonic Software Corporation, Jan. 2004.

(Continued)

*Primary Examiner* — Tim T Vo
*Assistant Examiner* — Hasanul Mobin
(74) *Attorney, Agent, or Firm* — Hickman Palermo Truong & Becker LLP; Eric L. Sutton

(57) ABSTRACT

A method and apparatus for performing an action in response to a file system event is provided. According to one aspect, sets of "event listeners" are associated with a file hierarchy and/or the nodes thereof. Each event listener contains a set of "event handlers." Each event handler corresponds to a separate type of event that may occur relative to the file hierarchy's nodes. When an event is going to occur relative to the hierarchy or a node thereof, all event listeners that are associated with that hierarchy/node are inspected to determine whether those event listeners contain any event handlers that correspond to the event's type. Those event handlers that correspond to the event's type are placed in an ordered list of event handlers to be invoked. As the event handlers in the list are invoked, programmatic mechanisms that correspond to those event handlers are executed to perform customized user-specified actions.

20 Claims, 8 Drawing Sheets

U.S. PATENT DOCUMENTS

| | | | |
|---|---|---|---|
| 5,295,256 A | 3/1994 | Bapat | |
| 5,307,490 A | 4/1994 | Davidson et al. | |
| 5,313,629 A | 5/1994 | Abraham et al. | |
| 5,327,556 A | 7/1994 | Mohan et al. | |
| 5,369,763 A | 11/1994 | Biles | |
| 5,388,257 A | 2/1995 | Bauer | |
| 5,410,691 A | 4/1995 | Taylor | |
| 5,454,101 A | 9/1995 | Mackay et al. | |
| 5,463,772 A | 10/1995 | Thompson et al. | |
| 5,467,471 A | 11/1995 | Bader | |
| 5,493,682 A * | 2/1996 | Tyra et al. | 717/122 |
| 5,499,358 A | 3/1996 | Nevarez | |
| 5,499,371 A | 3/1996 | Henninger et al. | |
| 5,504,892 A | 4/1996 | Atatt et al. | |
| 5,524,240 A | 6/1996 | Barbara et al. | |
| 5,530,849 A | 6/1996 | Hanushevsky et al. | |
| 5,544,360 A | 8/1996 | Lewak et al. | |
| 5,546,571 A | 8/1996 | Shan et al. | |
| 5,561,763 A | 10/1996 | Eto et al. | |
| 5,566,331 A | 10/1996 | Irwin, Jr. et al. | |
| 5,566,337 A | 10/1996 | Szymanski et al. | |
| 5,568,640 A | 10/1996 | Nishiyama et al. | |
| 5,574,915 A | 11/1996 | Lemon et al. | |
| 5,643,633 A | 7/1997 | Telford et al. | |
| 5,649,200 A | 7/1997 | Leblang et al. | |
| 5,675,802 A | 10/1997 | Allen et al. | |
| 5,680,614 A | 10/1997 | Bakuya et al. | |
| 5,682,524 A | 10/1997 | Freund et al. | |
| 5,684,990 A | 11/1997 | Boothby | |
| 5,689,706 A | 11/1997 | Rao et al. | |
| 5,701,467 A | 12/1997 | Freeston | |
| 5,706,510 A | 1/1998 | Burgoon | |
| 5,729,689 A | 3/1998 | Allard et al. | |
| 5,737,736 A | 4/1998 | Chang et al. | |
| 5,758,153 A | 5/1998 | Atsatt et al. | |
| 5,778,179 A | 7/1998 | Kanai et al. | |
| 5,778,354 A | 7/1998 | Leslie et al. | |
| 5,802,518 A | 9/1998 | Karaev et al. | |
| 5,806,078 A | 9/1998 | Hug et al. | |
| 5,819,275 A | 10/1998 | Badger et al. | |
| 5,822,511 A | 10/1998 | Kashyap et al. | |
| 5,825,353 A | 10/1998 | Will | |
| 5,832,526 A | 11/1998 | Schuyler | |
| 5,838,965 A | 11/1998 | Kavanagh et al. | |
| 5,842,212 A | 11/1998 | Ballurio et al. | |
| 5,848,246 A | 12/1998 | Gish | |
| 5,864,870 A | 1/1999 | Guck | |
| 5,870,590 A | 2/1999 | Kita et al. | |
| 5,873,086 A | 2/1999 | Fujii et al. | |
| 5,878,410 A | 3/1999 | Zbikowski et al. | |
| 5,878,415 A | 3/1999 | Olds | |
| 5,878,434 A | 3/1999 | Draper et al. | |
| 5,890,147 A | 3/1999 | Peltonen et al. | |
| 5,892,535 A | 4/1999 | Allen et al. | |
| 5,897,638 A | 4/1999 | Lasser et al. | |
| 5,915,253 A | 6/1999 | Christansen | |
| 5,917,492 A | 6/1999 | Bereiter | |
| 5,918,225 A | 6/1999 | White et al. | |
| 5,921,582 A | 7/1999 | Gusack | |
| 5,924,088 A | 7/1999 | Jakobsson et al. | |
| 5,937,406 A | 8/1999 | Balabine et al. | |
| 5,956,506 A | 9/1999 | Cobb et al. | |
| 5,974,407 A | 10/1999 | Sacks | |
| 5,978,791 A | 11/1999 | Farber et al. | |
| 5,983,277 A | 11/1999 | Heile et al. | |
| 5,991,771 A | 11/1999 | Falls et al. | |
| 6,008,806 A | 12/1999 | Nakajima et al. | |
| 6,021,414 A | 2/2000 | Fuller | |
| 6,023,706 A | 2/2000 | Schmuck et al. | |
| 6,026,402 A | 2/2000 | Vossen et al. | |
| 6,029,160 A | 2/2000 | Cabrera et al. | |
| 6,029,166 A | 2/2000 | Mutalik et al. | |
| 6,029,175 A | 2/2000 | Chow et al. | |
| 6,052,122 A | 4/2000 | Sutcliffe et al. | |
| 6,055,527 A | 4/2000 | Badger et al. | |
| 6,088,694 A | 7/2000 | Burns et al. | |
| 6,092,086 A | 7/2000 | Martin et al. | |
| 6,101,500 A | 8/2000 | Lau | |
| 6,111,578 A | 8/2000 | Tesler | |
| 6,112,209 A | 8/2000 | Gusack | |
| 6,115,741 A | 9/2000 | Domenkos et al. | |
| 6,119,118 A | 9/2000 | Kain, III et al. | |
| 6,122,645 A | 9/2000 | Bohannon et al. | |
| 6,128,610 A | 10/2000 | Srinivasan et al. | |
| 6,182,121 B1 | 1/2001 | Wlaschin | |
| 6,185,524 B1 | 2/2001 | Howard et al. | |
| 6,192,273 B1 | 2/2001 | Igel et al. | |
| 6,192,373 B1 | 2/2001 | Haegele | |
| 6,208,993 B1 | 3/2001 | Shadmon | |
| 6,212,512 B1 | 4/2001 | Barney et al. | |
| 6,212,557 B1 | 4/2001 | Oran | |
| 6,230,310 B1 | 5/2001 | Arroye et al. | |
| 6,233,729 B1 | 5/2001 | Campara et al. | |
| 6,236,988 B1 | 5/2001 | Aldred | |
| 6,236,991 B1 | 5/2001 | Frauehofer et al. | |
| 6,247,024 B1 | 6/2001 | Kincaid | |
| 6,279,005 B1 | 8/2001 | Zellweger | |
| 6,279,007 B1 | 8/2001 | Uppala | |
| 6,301,592 B1 | 10/2001 | Aoyama et al. | |
| 6,301,605 B1 | 10/2001 | Napolitano et al. | |
| 6,314,408 B1 | 11/2001 | Salas et al. | |
| 6,321,219 B1 | 11/2001 | Gainer et al. | |
| 6,330,573 B1 | 12/2001 | Salisbury et al. | |
| 6,332,200 B1 | 12/2001 | Meth et al. | |
| 6,339,382 B1 | 1/2002 | Arbinger et al. | |
| 6,349,295 B1 | 2/2002 | Tedesco et al. | |
| 6,366,902 B1 | 4/2002 | Lyle et al. | |
| 6,366,921 B1 | 4/2002 | Hansen et al. | |
| 6,366,988 B1 | 4/2002 | Skiba et al. | |
| 6,370,537 B1 | 4/2002 | Gilbert et al. | |
| 6,370,548 B1 | 4/2002 | Bauer et al. | |
| 6,381,607 B1 | 4/2002 | Wu et al. | |
| 6,389,427 B1 | 5/2002 | Faulkner | |
| 6,389,433 B1 | 5/2002 | Bolosky et al. | |
| 6,393,435 B1 | 5/2002 | Gartner et al. | |
| 6,393,456 B1 | 5/2002 | Ambler et al. | |
| 6,397,231 B1 | 5/2002 | Salisbury et al. | |
| 6,421,692 B1 | 7/2002 | Milne et al. | |
| 6,427,123 B1 | 7/2002 | Sedlar | |
| 6,430,575 B1 | 8/2002 | Dourish et al. | |
| 6,438,550 B1 | 8/2002 | Doyle et al. | |
| 6,442,548 B1 | 8/2002 | Balabine et al. | |
| 6,446,091 B1 | 9/2002 | Noren et al. | |
| 6,453,325 B1 | 9/2002 | Cabrera et al. | |
| 6,457,007 B1 | 9/2002 | Kikuchi et al. | |
| 6,457,065 B1 | 9/2002 | Rich et al. | |
| 6,487,469 B1 | 11/2002 | Formenti | |
| 6,487,552 B1 | 11/2002 | Lei et al. | |
| 6,493,742 B1 | 12/2002 | Holland et al. | |
| 6,505,212 B2 | 1/2003 | Nakano et al. | |
| 6,519,597 B1 | 2/2003 | Cheng et al. | |
| 6,532,488 B1 | 3/2003 | Ciarlante et al. | |
| 6,549,916 B1 * | 4/2003 | Sedlar | 1/1 |
| 6,584,459 B1 | 6/2003 | Chang et al. | |
| 6,587,873 B1 | 7/2003 | Nobakht et al. | |
| 6,594,675 B1 | 7/2003 | Schneider | |
| 6,604,100 B1 | 8/2003 | Fernandez et al. | |
| 6,604,236 B1 | 8/2003 | Draper et al. | |
| 6,611,843 B1 | 8/2003 | Jacobs | |
| 6,631,366 B1 | 10/2003 | Nagavamsi et al. | |
| 6,636,845 B2 | 10/2003 | Chau et al. | |
| 6,643,633 B2 | 11/2003 | Chau et al. | |
| 6,654,734 B1 | 11/2003 | Mani et al. | |
| 6,681,221 B1 | 1/2004 | Jacobs | |
| 6,697,805 B1 | 2/2004 | Choquier et al. | |
| 6,711,595 B1 | 3/2004 | Anantharao | |
| 6,725,212 B2 | 4/2004 | Couch et al. | |
| 6,725,227 B1 | 4/2004 | Li | |
| 6,772,350 B1 | 8/2004 | Belani et al. | |
| 6,782,380 B1 | 8/2004 | Thede | |
| 6,889,223 B2 | 5/2005 | Hattori | |
| 6,959,416 B2 | 10/2005 | Manning et al. | |
| 6,965,894 B2 | 11/2005 | Leung et al. | |
| 6,970,975 B2 | 11/2005 | Frank | |
| 6,973,455 B1 | 12/2005 | Vahalia et al. | |
| 7,031,956 B1 | 4/2006 | Lee et al. | |
| 7,043,472 B2 | 5/2006 | Aridor et al. | |

| | | |
|---|---|---|
| 7,047,253 B1 | 5/2006 | Murthy et al. |
| 7,051,039 B1 | 5/2006 | Murthy et al. |
| 7,062,507 B2 | 6/2006 | Wang et al. |
| 7,089,239 B1 | 8/2006 | Baer et al. |
| 7,096,224 B2 | 8/2006 | Murthy et al. |
| 7,117,216 B2 | 10/2006 | Charkaborty |
| 7,139,746 B2 | 11/2006 | Shin et al. |
| 7,162,485 B2 | 1/2007 | Gottlob et al. |
| 7,171,404 B2 | 1/2007 | Lindblad et al. |
| 7,171,407 B2 | 1/2007 | Barton et al. |
| 7,216,127 B2 | 5/2007 | Auerbach |
| 7,418,435 B1 | 8/2008 | Sedlar |
| 2001/0049675 A1 | 12/2001 | Mandler et al. |
| 2001/0504042 | 12/2001 | Watkins et al. |
| 2002/0056025 A1 | 5/2002 | Qiu et al. |
| 2002/0073056 A1 | 6/2002 | Broster et al. |
| 2002/0078068 A1 | 6/2002 | Krishnaprasad et al. |
| 2002/0095421 A1 | 7/2002 | Koskas |
| 2002/0103829 A1 | 8/2002 | Manning et al. |
| 2002/0120858 A1 | 8/2002 | Porter et al. |
| 2002/0133484 A1 | 9/2002 | Chau et al. |
| 2002/0138617 A1 | 9/2002 | Christfort et al. |
| 2002/0152267 A1 | 10/2002 | Lennon |
| 2002/0184401 A1 | 12/2002 | Kadel, Jr. et al. |
| 2002/0188613 A1* | 12/2002 | Chakraborty et al. ......... 707/100 |
| 2003/0004937 A1 | 1/2003 | Salmenkaita et al. |
| 2003/0033285 A1 | 2/2003 | Jalali et al. |
| 2003/0065659 A1 | 4/2003 | Agarwal et al. |
| 2003/0084056 A1 | 5/2003 | DeAnna et al. |
| 2003/0101194 A1 | 5/2003 | Rys et al. |
| 2003/0131051 A1* | 7/2003 | Lection et al. ................ 709/203 |
| 2003/0167456 A1 | 9/2003 | Sabarwal |
| 2003/0177341 A1 | 9/2003 | Devillers |
| 2003/0195865 A1 | 10/2003 | Long et al. |
| 2003/0200197 A1 | 10/2003 | Long et al. |
| 2003/0212662 A1 | 11/2003 | Shin et al. |
| 2003/0212664 A1 | 11/2003 | Brening et al. |
| 2003/0233618 A1 | 12/2003 | Wan |
| 2004/0010752 A1 | 1/2004 | Chan et al. |
| 2004/0043758 A1 | 3/2004 | Sorvari et al. |
| 2004/0044659 A1 | 3/2004 | Judd et al. |
| 2004/0064466 A1 | 4/2004 | Manikutty et al. |
| 2004/0073541 A1 | 4/2004 | Lindblad et al. |
| 2004/0083222 A1 | 4/2004 | Pecherer |
| 2004/0088320 A1 | 5/2004 | Perry |
| 2004/0103105 A1 | 5/2004 | Lindblad et al. |
| 2004/0103282 A1 | 5/2004 | Meier et al. |
| 2004/0148278 A1 | 7/2004 | Milo et al. |
| 2004/0167864 A1 | 8/2004 | Wang et al. |
| 2004/0176958 A1 | 9/2004 | Salmenkaita et al. |
| 2004/0205551 A1* | 10/2004 | Santos .......................... 715/513 |
| 2004/0221226 A1 | 11/2004 | Lin et al. |
| 2004/0225680 A1 | 11/2004 | Cameron et al. |
| 2004/0267760 A1 | 12/2004 | Brundage et al. |
| 2005/0038688 A1 | 2/2005 | Collins et al. |
| 2005/0050016 A1 | 3/2005 | Stanoi et al. |
| 2005/0091188 A1 | 4/2005 | Pal et al. |
| 2005/0097084 A1 | 5/2005 | Balmin et al. |
| 2005/0097108 A1 | 5/2005 | Wang et al. |
| 2005/0102256 A1 | 5/2005 | Bordawekar et al. |
| 2005/0108630 A1 | 5/2005 | Wasson et al. |
| 2005/0114314 A1 | 5/2005 | Fan et al. |
| 2005/0120031 A1 | 6/2005 | Ishii |
| 2005/0160108 A1 | 7/2005 | Charlet et al. |
| 2005/0228786 A1 | 10/2005 | Murthy et al. |
| 2005/0228792 A1 | 10/2005 | Chandrasekaran et al. |
| 2005/0228818 A1 | 10/2005 | Murthy et al. |
| 2005/0229158 A1 | 10/2005 | Thusoo et al. |
| 2005/0257201 A1 | 11/2005 | Rose et al. |
| 2005/0278354 A1 | 12/2005 | Gupta et al. |
| 2005/0289125 A1 | 12/2005 | Liu et al. |
| 2005/0289138 A1 | 12/2005 | Cheng et al. |
| 2006/0195476 A1 | 8/2006 | Nori et al. |

FOREIGN PATENT DOCUMENTS

| | | |
|---|---|---|
| GB | 2409078 A | 6/2005 |
| JP | 07-085102 | 3/1995 |
| WO | WO 97/46956 A1 | 12/1997 |
| WO | WO 98/00795 | 1/1998 |
| WO | WO 00/14632 A1 | 3/2000 |
| WO | WO 00/49533 A2 | 8/2000 |
| WO | WO 01/42881 A2 | 6/2001 |
| WO | WO 01/59602 A1 | 8/2001 |
| WO | WO 01/61566 A1 | 8/2001 |
| WO | WO 03/027908 A2 | 4/2003 |

OTHER PUBLICATIONS

Ali-Khalifa, S. et al., "Structural Joins: A Primitive for Efficient XML Query Pattern Matching," Feb. 26-Mar. 1, 2002, Data Engineering, 2002, Proceedings, 18$^{th}$ International Conference, pp. 141-152.

Bouret, R. et al, "A Generic Load Extract Utility for Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.

Brage, D. et al., "A Graphical Environment to Query XML Data with Query," Proceedings of the Fourth International Conference on Web Information Systems Engineering (WISE '03), 2003, IEEE, 10 pages.

Chae, Mi-Ok, et al., "Design and Implementation of an Object-Oriented Multimedia DBMS Tightly Coupled with Information Retrieval Functions," Proc. 17$^{th}$ IASTED International Conference on Applied Informatics, Feb. 15-18, 1999, abstract.

Chakraborty, K., "The XML Garbage Collector," The Source for Developers, Sun Developer Network Site XP-002297849, Mar. 2002.

Chen, Ruey-Shun et al., "Developing an XML framework for metadata system," Trinity College Dublin, Proc. of the 1$^{st}$ International Sympo on Information and Communication, pp. 267-272.

Cheng, J. et al., "IBM DB2 XML Extender," IEEE, ICDE '00 Conference, San Diego, Feb. 2000, 128 pages.

Current Claims in PCT/US03/355551, pp. 20-23.

Jajodia, S. et al., "Toward a Multilevel Secure Relational Data Model," ACM, 1991, 8393 SIGMOD Record (Jan. 20, 1991) No. 2, New York, US, XP 000364619, pp. 50-59.

Manolescu, D., Review of "Metadata solutions: using metamodels, repositories, XML, and enterprise portals to generate information on demand by Adrienne Tannebaum," Mar. 2003, ACM Press, vol. 28, Issue 2, p. 38.

Noser, H. et al., "Dynamic D3 Visualization of Database-Defined Tree Structures on the WWW by Using Rewriting Systems," 2000, IEEE, XP-002262516, pp. 247-254.

Oracle, "Oracle iFS (Internet File System)," Mar. 1999, XP-002204710, 3 pages.

Rao, H. et al., "An Overview of the Internet File System," 1997, IEEE, XP-002204711, pp. 474-477.

Ricardo, C., "Database Systems: Principles, Design & Implementation," 1990, MacMillian Publishing Co., pp. 357-361, 379-380.

Vorthmann, S. et al., "Beyond Schemas, Schema Adjuncts and the Outside World," Markup Languages, Online!, vol. 2, No. 3, Jun. 2000, pp. 1-8.

Written Opinion, Application No. PCT/US03/35551 (8 pages).

European Patent Office, "Communication Pursuant to Article 96(2) EPC," App. No. 00952215.2 dated Oct. 5, 2006, (7 pages).

Amended Claims, EP App. 00952215.2 (26 pages).

International Searching Authority, "Notification of Transmittal of the International Search Report and the Written Opinion of the International Searching Authority, or the Declaration," PCT/US2005,011763, dated Aug. 6, 2005 (12 pages).

Current Claims, PCT/US2005/011763 (4 pages).

Cooper, B. et al., "A Fast Index for Semistructured Data," Proceeding of the International Conference on Very Large Databases, 2001, XP-002303292 (pp. 341-350).

McHugh, J. et al., "Indexing Semistructural Data," Stanford Science Department, 1998, XP-002248313 (pp. 1-21).

European Patent Office, "Communication Pursuant to Article 96(2) EPC," EP Application No. 02799692.5, dated Jan. 18, 2006 (5 pages).

Current Claims, PCT/US02/31168, EP App. No. 02799692.5 (8 pages).

McHugh, J. et al., "Query Optimization for XML," XP-002333353, *Proceedings of the 25$^{th}$ VLDB Conference* (1999) pp. 315-326.

Yoshikawa, M. et al., "XRel: A Path-Based Approach to Storage and Retrieval of XML Documents Using Relational Databases," XP-001143686, *ACM Transactions on Internet Technology* (2001), pp. 110-141.

Notification of Transmittal of the International Search Report and the Written Opinion of the International Searching Authority, or the Declaration received from International application No. PCT/US205/011762.

IBM, "A method for faster searches of external file properties using negative caching of directory relationships," IBM Corporation, IBM Technical Disclosure Bulletin, dated Jan. 1, 2001 (2 pages).

Claims, Foreign Application No. 200580018627.9 (3 pages).

State Intellectual Property Office of P.R.C., "Notification of the First Office Action," Foreign Application No. 200580018627.9, mailed Oct. 12, 2007 (9 pages).

Jurgens, M. et al., "PISA: Performance Models for Index Structures with and without Aggregated Data," German Research Society, 1999 (7 pages).

Pal, S. et al., "Indexing XML Data Stored in a Relational Database," Proceedings of the 30$^{th}$ VLDB Conference, 2004 (12 pages).

"Notice of Allowance and Fee Due" received in U.S. Appl. No. 10/944,170 dated Apr. 7, 2008 (8 pages).

Giradot et al., "Milau: an encoding format for efficient representation and exchange of XML over the Web," IBM Almaden Research Center (24 pages).

Mackenzie et al., "Finding Files" FindUtils, Version 4.1.2, Source Code, GNU.org. Nov. 1997, source files, code.C,. (22 pages).

Cormen et al., "Introduction to Algorithms," MIT Press, 2001, 2$^{nd}$ edition (4 pages).

European Patent Office, "Communication pursuant to Article 94(3) EPC," European patent application 05732473.3-1225, dated Feb. 4, 2008 (7 pages).

Claims, European patent application 2005800186273.9 (3 pages).

Claims, European patent application 05732473.3-1225 (3 pages).

Japanese Patent Office, "Questioning (Office Action)" with "Pending Claims" attached, Foreign Application No. 600202/2000.

Douglas et al., "Elephant: The File System That Never Forgets," in Proceedings of the IEEE Workshop on Hopt Topics in Operating Systems (HotOS VII), Mar. 1999 (6 pages).

Canadian Office Action received in Application No. 2,646,776 dated Dec. 23, 2009 (4 pages).

Current Claims of Application No. 2,646,776, Dec. 2009 (3 pages).

U.S. Appl. No. 11/014,442, filed Dec. 15, 2004, Notice of Allowance, Oct. 27, 2011.

U.S. Appl. No. 12/122,517, filed May 16, 2008, Notice of Allowance, Jul. 14, 2011.

U.S. Appl. No. 11/014,442, filed Dec. 15, 2004, Decision on Appeal, Jul. 25, 2011.

\* cited by examiner

| | | FILES TABLE | | |
|---|---|---|---|---|
| Row ID | File ID | Name | Body | Modification Date... |
| R1 | X1 | / | (NULL) | |
| R2 | X2 | Windows | (NULL) | |
| R3 | X3 | Word | (NULL) | |
| R4 | X4 | Example.doc | BLOB | |
| R5 | X5 | Access | (NULL) | |
| R6 | X6 | Unix | (NULL) | |
| R7 | X7 | App1 | (NULL) | |
| R8 | X8 | App2 | (NULL) | |
| R9 | X9 | VMS | (NULL) | |
| R10 | X10 | App3 | (NULL) | |
| R11 | X11 | App4 | (NULL) | |
| R12 | X12 | Example.doc | BLOB | |

DIRECTORY_LINKS TABLE  310

| Parent ID | Child ID | Child_Name |
|---|---|---|
| X1 | X2 | Windows |
| X2 | X3 | Word |
| X3 | X4 | Example.doc |
| X2 | X5 | Access |
| X1 | X6 | Unix |
| X6 | X7 | App1 |
| X6 | X8 | App2 |
| X1 | X9 | VMS |
| X9 | X10 | App3 |
| X9 | X11 | App4 |
| X11 | X12 | Example.doc |

Fig. 3

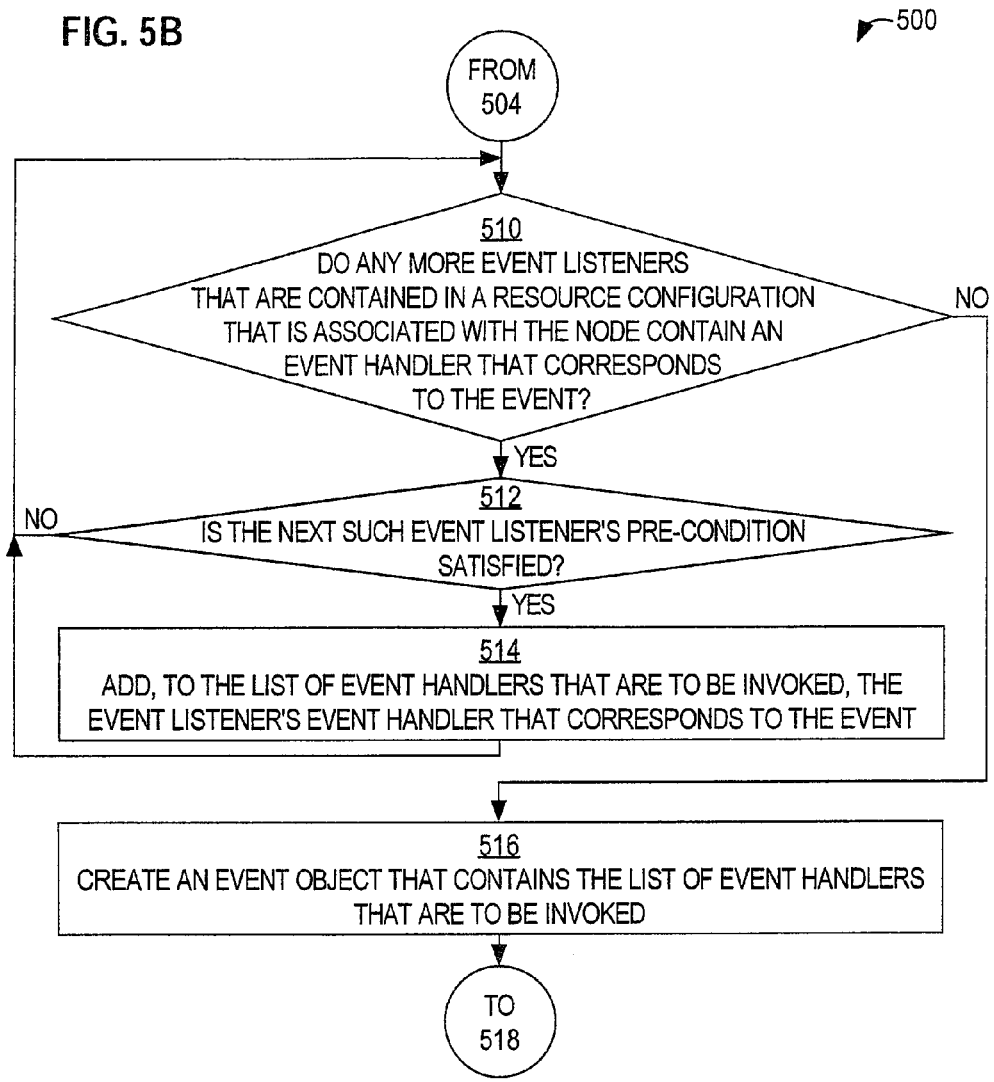

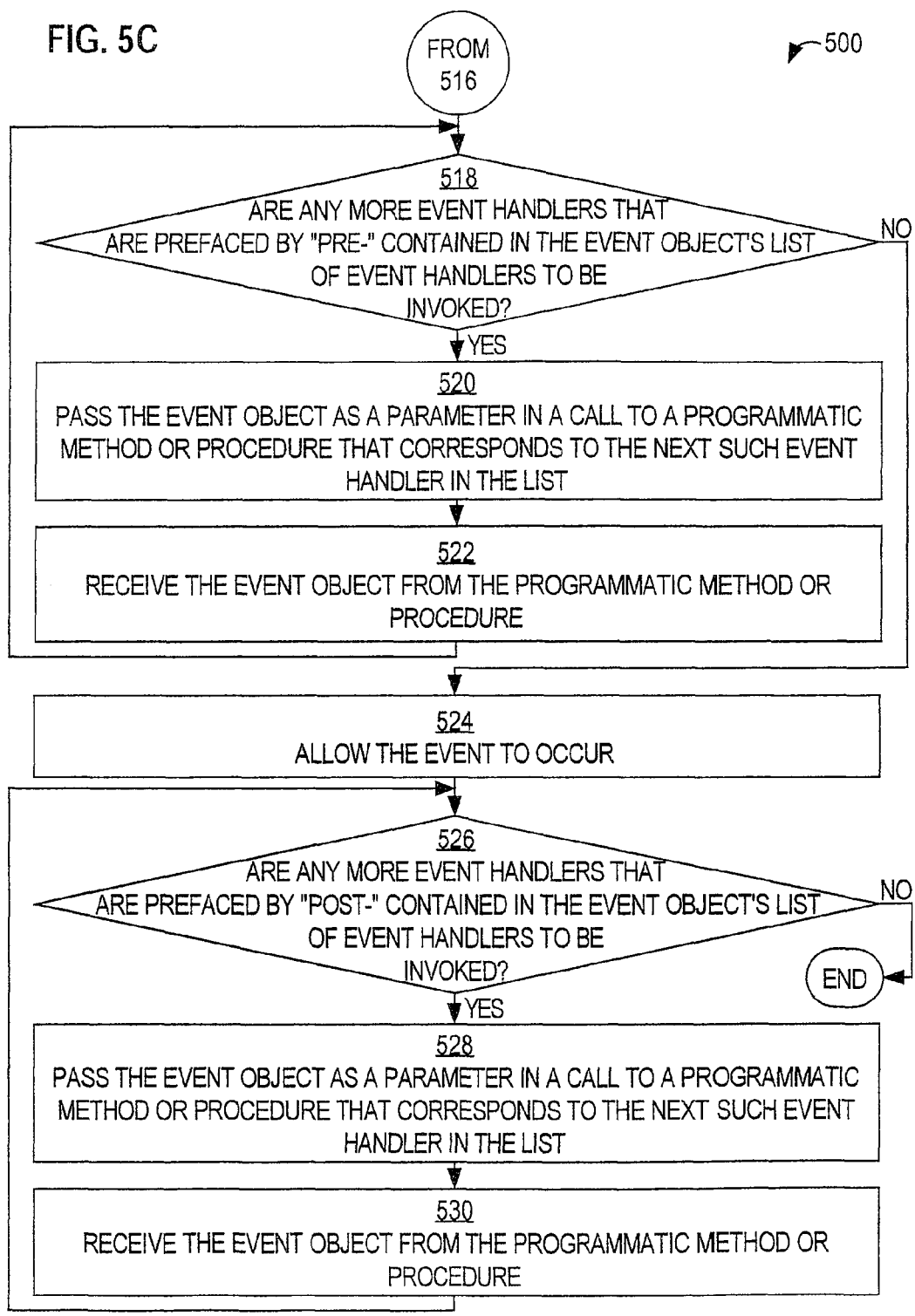

PERFORMING AN ACTION IN RESPONSE TO A FILE SYSTEM EVENT

BENEFIT CLAIM; RELATED CASES

This application is a continuation of application Ser. No. 11/014,502, filed Dec. 15, 2004, now U.S. Pat. No. 7,921,076 entitled "PERFORMING AN ACTION IN RESPONSE TO A FILE SYSTEM EVENT," the entire contents of which is incorporated by reference herein in its entirety.

The present application is related to U.S. Pat. No. 6,427,123, entitled "HIERARCHICAL INDEXING FOR ACCESSING HIERARCHICALLY ORGANIZED INFORMATION IN A RELATIONAL SYSTEM", filed Feb. 18, 1999; U.S. Pat. No. 6,549,916, entitled "EVENT NOTIFICATION SYSTEM TIED TO FILE SYSTEM", filed May 15, 2000; U.S. patent application Ser. No. 09/571,060, entitled "BASING DIRECTORY CONTENTS ON A QUERY THAT IS ASSOCIATED WITH A FILE IDENTIFIER", filed May 15, 2000; U.S. patent application Ser. No. 09/571,696, entitled "VERSIONING IN INTERNET FILE SYSTEM", filed May 15, 2000; U.S. patent application Ser. No. 10/259,176, entitled "MECHANISM FOR UNIFORM ACCESS CONTROL IN A DATABASE SYSTEM", filed Sep. 27, 2003; U.S. patent application Ser. No. 10/260,381, entitled "MECHANISM TO EFFICIENTLY INDEX STRUCTURED DATA THAT PROVIDES HIERARCHICAL ACCESS IN A RELATIONAL DATABASE SYSTEM", filed Sep. 27, 2002; U.S. patent application Ser. No. 10/306,485, entitled "TECHNIQUES FOR MANAGING HIERARCHICAL DATA WITH LINK ATTRIBUTES IN A RELATIONAL DATABASE", filed Nov. 26, 2002; U.S. patent application Ser. No. 10/884,311, entitled "INDEX FOR ACCESSING XML DATA", filed Jul. 2, 2004; U.S. patent application Ser. No. 10/944,177, entitled "INDEX MAINTENANCE FOR OPERATIONS INVOLVING INDEXED XML DATA", filed Sep. 16, 2004; U.S. patent application Ser. No. 10/944,170, entitled "EFFICIENT QUERY PROCESSING OF XML DATA USING XML INDEX", filed Sep. 16, 2004; U.S. patent application Ser. No. 10/452,164, entitled "TRANSACTION-AWARE CACHING FOR ACCESS CONTROL METADATA", filed May 30, 2003; U.S. patent application Ser. No. 10/452,163, entitled "TRANSACTION-AWARE CACHING FOR FOLDER PATH DATA", filed May 30, 2003; U.S. patent application Ser. No. 09/728,909, entitled "HIERARCHY-BASED SECURED DOCUMENT REPOSITORY", filed Dec. 1, 2000; and U.S. patent application Ser. No. 11/014,442, entitled "A COMPREHENSIVE FRAMEWORK TO INTEGRATE BUSINESS LOGIC AND RULES INTO A REPOSITORY", filed Dec. 15, 2004; the contents of all of which are hereby incorporated by reference in their entirety for all purposes as if fully set forth herein.

FIELD OF THE INVENTION

The present invention relates to computer file systems, and in particular, to performing an action in response to a file system event.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Emulating a Hierarchical File System in a Relational Database System

Humans tend to organize information in categories. The categories in which information is organized are themselves typically organized relative to each other in some form of hierarchy. For example, an individual animal belongs to a species, the species belongs to a genus, the genus belongs to a family, the family belongs to an order, and the order belongs to a class.

With the advent of computer systems, techniques for storing electronic information have been developed that largely reflected this human desire for hierarchical organization. Conventional computer file systems, for example, are typically implemented using hierarchy-based organization principles. Specifically, a typical file system has directories arranged in a hierarchy, and documents stored in the directories. Ideally, the hierarchical relationships between the directories reflect some intuitive relationship between the meanings that have been assigned to the directories. Similarly, it is ideal for each document to be stored in a directory based on some intuitive relationship between the contents of the document and the meaning assigned to the directory in which the document is stored.

FIG. 1 shows an example of a typical file system. The illustrated file system includes numerous directories arranged in a hierarchy. Two documents 118 and 122 are stored in the directories. Specifically, documents 118 and 122, both of which are entitled "Example.doc", are respectively stored in directories 116 and 124, which are respectively entitled "Word" and "App4".

In the directory hierarchy, directory 116 is a child of directory 114 entitled "Windows", and directory 114 is a child of directory 110. Similarly, directory 124 is a child of directory 126 entitled "VMS", and directory 126 is a child of directory 110. Directory 110 is referred to as the "root" directory because it is the directory from which all other directories descend. In many systems, the symbol "/" is used to refer to the root directory. Each of directories 110, 114, 116, 120, 124, 126, and each of documents 118 and 122, is a separate node in the directory hierarchy.

When electronic information is organized in a hierarchy, each item of information may be located by following a "path" through the hierarchy to the entity that contains the item. Within a hierarchical file system, the path to an item begins at the root directory and proceeds down the hierarchy of directories to eventually arrive at the directory that contains the item of interest. For example, the path to file 118 consists of directories 110, 114 and 116, in that order.

Hierarchical storage systems often allow different items to have the same name. For example, in the file system shown in FIG. 1, both of the documents 118 and 122 are entitled "Example.doc". Consequently, to unambiguously identify a given document, more than just the name of the document is required.

A convenient way to identify and locate a specific item of information stored in a hierarchical storage system is through the use of a "pathname". A pathname is a concise way of uniquely identifying an item based on the path through the hierarchy to the item. A pathname is composed of a sequence of names. In the context of a file system, each name in the sequence of names is a "filename". The term "filename"

refers to both the names of directories and the names of documents, since both directories and documents are considered to be "files".

Within a file system, the sequence of filenames in a given pathname begins with the name of the root directory, includes the names of all directories along the path from the root directory to the item of interest, and terminates in the name of the item of interest. Typically, the list of directories to traverse is concatenated together, with some kind of separator punctuation (e.g., '/', '\', or ';') to make a pathname. Thus, the pathname for document 118 is /Windows/Word/Example.doc, while the pathname for document 122 is /VMS/App4/Example.doc.

The relationship between directories (files) and their contained content varies significantly between different types of hierarchically organized systems. One model, employed by various implementations, such as Windows and DOS file systems, requires each file to have exactly one parent, forming a tree. In a more complicated model, the hierarchy takes the form of a directed graph, where files can have multiple parents, as in the UNIX file system in which hard links are used.

In contrast to hierarchical approaches to organizing electronic information, a relational database stores information in tables comprised of rows and columns. Each row is identified by a unique row ID. Each column represents an attribute of a record, and each row represents a particular record. Data is retrieved from the database by submitting queries to a database management system (DBMS) that manages the database.

Each type of storage system has advantages and limitations. A hierarchically organized storage system is simple, intuitive, and easy to implement, and is a standard model used by most application programs. Unfortunately, the simplicity of the hierarchical organization does not provide the support required for complex data retrieval operations. For example, the contents of every directory may have to be inspected to retrieve all documents created on a particular day that have a particular filename. Since all directories must be searched, the hierarchical organization does nothing to facilitate the retrieval process.

A relational database system is well suited for storing large amounts of information and for accessing data in a very flexible manner. Relative to hierarchically organized systems, data that matches even complex search criteria may be easily and efficiently retrieved from a relational database system. However, the process of formulating and submitting queries to a database server is less intuitive than merely traversing a hierarchy of directories, and is beyond the technical comfort level of many computer users.

In the past, hierarchically organized systems and relationally organized systems have been implemented in different ways that were not compatible. With some additional processing, however, a relationally organized system can emulate a hierarchically organized system. This type of emulation is especially desirable when the storage capability and flexibility of a relational system is needed, but the intuitiveness and ubiquity of the hierarchical system is desired.

Such emulation may be implemented through the use of two relational tables: a "file" table and a "directory links" table. The file table stores information relating to each file in the emulated hierarchical system. For files that are documents, the file table further stores either the body of the file (in the form of a large binary object (BLOB)), or a pointer to the body of the document. The directory links table stores all of the link information that indicates the parent-child relationships between files.

To understand how these two tables may be used to emulate a hierarchical storage system, one may suppose that a file system having the hierarchical structure of FIG. 1 is implemented in a database. The file system of FIG. 1 can be illustrated as follows (a unique ID, shown in parentheses, is assigned by the system to uniquely identify each file):

```
/ (X1)
    Windows (X2)
        Word (X3)
            Example.doc (X4)
        Access (X5)
    Unix (X6)
        App1 (X7)
        App2 (X8)
    VMS (X9)
        App3 (X10)
        App4 (X11)
            Example.doc (X12)
```

FIG. 2 shows a files table 210, and FIG. 3 shows a directory links table 310, which may be used by a computer system to emulate the file system of FIG. 1 in a relational database system. Files table 210 contains an entry for each file in the system. Each entry includes a row ID, a file ID, a name, a body column, and a modification date column (plus other system-maintained information such as creation date, access permission information, etc.).

The file ID, also known as the "object ID" or "OID," is a unique ID assigned to each file by the system. The name is the name assigned to the file, which does not need to be unique. The body is the field in which the contents of a file are stored. The body field may store the actual contents of a file in the form of a binary large object (BLOB), or a pointer to the contents of the file. Where the entry is for a file having no content (e.g. a directory), the body field is null. In the above example, only the two documents entitled Example.doc have content; thus, the body field for all of the other entries is null.

In directory links table 310, an entry is stored for each link between files in the file system of FIG. 1. Each entry includes a parent ID, a child ID, and a child_name field. For each link, the parent ID field specifies the file which is the parent file for the link, the child ID field specifies the file which is the child file for the link, and the child_name field specifies the name of the child file in the link. Thus, for example, in the entry for the link between root directory 110 and Windows directory 114, directory links table 310 specifies that X1 (the FileID of the root directory) is the parent ID, X2 (the FileID of the Windows directory) is the child ID, and "Windows" is the child_name.

To illustrate how the information in these two tables may be used to implement the file system of FIG. 1, one may suppose that it is necessary to access document 118. As explained above, document 118 has the path: /Windows/Word/Example.doc. To access this file, the DBMS makes an initial scan of directory links table 310 to find the entry where root directory 110 is the parent file and Windows directory 114 is the child file. To do this, the DBMS executes something like the following SQL statement:

```
Select ChildID
    from directory_links
    Where ParentID="X1"
        child_name="Window".
```

This query returns the ID of the child file, which in this case is X2 (for Windows directory 114). After obtaining the ID of the child file, the DBMS makes a second scan of the directory links table 310, this time looking for the entry where the parent file is Windows directory 114, and the child file is Word directory 116. This is achieved by executing the following Select statement:

```
Select ChildID
  from directory_links
 Where ParentID="X2" and
       Child_name="Word".
```

This query returns the ID of Word directory 116, which in this example is X3. With this information, the DBMS makes a third scan of directory links table 310, this time searching for the entry where the parent file is Word directory 116 and the child file is Example.doc document 118. This is achieved with the following Select statement:

```
Select ChildID
  from directory_links
 Where ParentID="X3" and
       Child_name="Example.doc"
```

At the end of this process, the ID of document 118 will have been determined. Using this ID as the primary key, the proper entry in files table 210 is located, and the contents of document 118 are accessed from the body field. Thus, using this technique, files that are actually stored in a relational structure, such as table 210, may be located and accessed using pathnames just as if they were stored in a hierarchically organized structure. The user submitting the pathname to locate a file need not understand the complexity of a relational system. Conversely, because the files are stored in a relational system, the files may be efficiently accessed in more sophisticated ways by users that are familiar with relational systems.

Triggers

In a database management system, a trigger is an object that specifies a series of actions to be automatically performed when a specific event occurs. According to industry standards, Data Manipulation (DML) statements—SQL statements that manipulate data in tables—are the events that cause user-defined triggers to be activated (or "fired"). For example, in a relational database, user-defined triggers may be designed to fire when a row of a database table or a table view is updated, inserted, or deleted. Accordingly, each user-defined trigger is typically associated with a single database table. That is, in a conventional database management system, the scope of the user-defined trigger is the table level of the database.

The series of actions specified by a trigger is typically written as instructions in a high-level database language such as SQL or PL/SQL (a procedural language extension of SQL available from Oracle Corporation of Redwood Shores, Calif.). In conformance with industry standards, these instructions must be able to access the data values of table columns corresponding to an affected row before the triggering DML statement was applied (the "old values") and after the modification was applied (the "new values").

Since triggers are objects, database customers can define, remove, and store triggers associated with a database table, and the database management system keeps track of which triggers have been defined for which table by storing that information as metadata (information about data) associated with the table in a data dictionary for the database. Consequently, triggers enable database customers to implement additional functionality in their databases for such purposes as enforcement of business rules and security.

As is discussed above, triggers may be associated with database tables, and a hierarchical file system may be represented through multiple tables. Unfortunately, triggers are very often unsuitable for specifying actions that are to be performed in response to events that occur relative to nodes in the file system. Events that occur relative to nodes in a file system do not always have a direct and unique correspondence with events that occur relative to the database tables that represent the file system. As a result, it is sometimes difficult to define a database table event that would correspond to a particular event in the file system. Although some events may occur relative to a database table whenever a particular event occurs relative to a file system, those events also might occur relative to the database table even in the absence of the particular event occurring relative to the file system.

Additionally, one or more of the database tables that represent the file system might not be accessible to users. As a result, users might not be able to associate triggers with the database tables that implement the file system. For example, ordinary users might not have sufficient privileges to associate customized triggers with files table 210 and/or database links table 310. Indeed, ordinary users might not understand how events occurring within the file system affect these tables. Ordinary users might be insulated from these tables to such an extent that they would not even be aware of the existence of these tables.

Ordinary users typically do understand hierarchical file systems, though, as well as the operations that can be performed on nodes within those file systems. Under many circumstances, users might find it useful for specified actions to be performed automatically in response to specified events occurring within a file system. A way of causing specified actions to be performed automatically in response to specified file system events is needed.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 shows a files table that may be used to emulate a hierarchically organized system in a relationally organized system;

FIG. 3 shows a directory links table that may be used in conjunction with the files table of FIG. 2 to emulate a hierarchically organized system;

FIGS. 5A-C show a flow diagram that illustrates a technique, according to an embodiment of the invention, for performing an action in response to a file system event.

DETAILED DESCRIPTION

Figure 1:
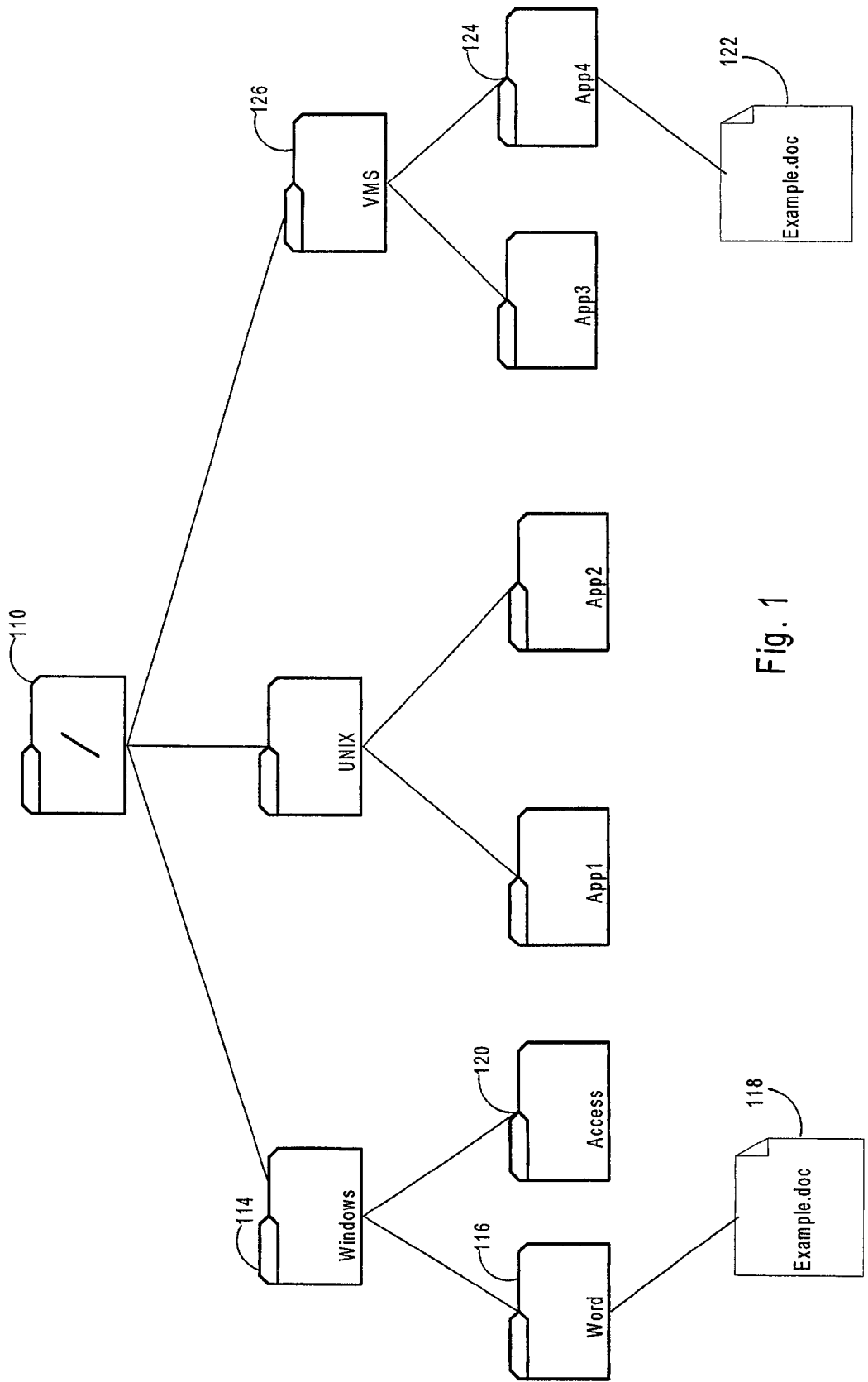
FIG. 1 is a block diagram illustrating a hierarchically organized file system.

A method and apparatus are described for performing an action in response to a file system event. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to one embodiment of the invention, sets of "event listeners" may be associated with individual nodes of a file hierarchy, and/or with the entire file hierarchy. Each event listener contains a set of "event handlers." Each event handler corresponds to a separate type of event that may occur relative to nodes, such as files and directories, in the file hierarchy.

In one embodiment, when an event is going to occur relative to a node in the file hierarchy, all event listeners that are associated with either the entire file hierarchy or the node relative to which the event is going to occur are inspected to determine whether those event listeners contain any event handlers that correspond to the event's type. Those event handlers that correspond to the event's type are placed in a list of event handlers to be invoked.

Each event handler corresponds to a separate programmatic mechanism. As the event handlers in the list are invoked, the programmatic mechanisms that correspond to those event handlers are executed. Such programmatic mechanisms may be custom-created by users, so that custom user-desired actions are performed in response to events occurring relative to nodes in the file system.

File System Events

The term "file system event" is defined herein as an event that occurs in response to a file system command being received through a file system interface. Examples of file system commands include commands to copy files, move files, delete files, create directories, list directory contents, remove directories, rename files, and rename directories. Other file system commands are well known. According to one embodiment, a file system command is mapped to one or more corresponding database commands. When issued to a database server, database commands cause the database server to perform operations on database objects such as database tables. These database commands are not received through a file system interface.

According to one embodiment, when a file system command is received through a file system interface, the one or more corresponding database commands are issued to a database server, which performs operations on database objects to carry out the file system command. System tables, which are not directly accessible to users, may be among the database objects upon which such operations are performed. Although a file system command may cause a database server to perform a specific operation relative to a specific database object, under some circumstances, the same specific operation may be performed relative to the same specific database object even in the absence of a file system command. Thus, while database events may occur in conjunction with file system events according to one embodiment, the same database events also may occur exclusively of file system events.

Resource Configurations

In one embodiment, event listeners are associated with a file hierarchy and/or the nodes thereof by associating "resource configurations" with the hierarchy and/or nodes.

Each resource configuration contains a list of one or more event listeners. According to one embodiment, each resource configuration is implemented as a separate XML document that conforms to a resource configuration schema.

Shown below is an example resource configuration schema that contains two separate event listeners. Each event listener is bounded by the "<listener>" and "</listener>" opening and closing tags.

```
<ResConfig xmlns="http://xmlns.oracle.com/xdb/XDBResConfig.xsd"
    xmlns:xsi="http://www.w3.org/2001/XMLSchema-instance"
    xsi:schemaLocation="http://xmlns.oracle.com/xdb/XDBResConfig.xsd
    http://xmlns.oracle.com/xdb/XDBResConfig.xsd">
  <event-listeners default-language="Java" default-schema="IFS">
    <listener>
      <description>Category application</description>
      <schema>CM</schema>
      <source>oracle.cm.category</source>
      <events>
        <Post-LinkIn/>
        <Post-UnlinkIn/>
        <Post-Update/>
      </events>
      <pre-condition>
        <existsNode>
          <XPath>/Resource[ContentType="image/gif"]</Xpath>
        </existsNode>
      </pre-condition>
    </listener>
    <listener>
      <description>Check quota</description>
      <source>oracle.ifs.quota</source>
      <events>
        <Post-LinkIn/>
        <Post-UnlinkIn/>
        <Post-Update>
      </events>
      <pre-condition>
        <existsNode>
          <XPath>r:/Resource/[ns:type="ifs-file"]</XPath>
          <namespace>
            xmlns:r="http://xmlns.oracle.com/xdb/XDBResource.xsd"
            xmlns:ns="http://foo.xsd"
          </namespace>
        </existsNode>
      </pre-condition>
    </listener>
  </event-listener>
</ResConfig>
```

In the above example, each "listener" element has a "description" child element that contains a description of the corresponding event listener. This first event listener's description is "Category application" and the second event listener's description is "Check quota".

Each listener element also has a "source" child element that contains a reference to a programmatic mechanism that implements all of the corresponding event listener's event handling mechanisms. The event handling mechanisms for the "Category application" event listener are implemented by programmatic mechanism "oracle.cm.category". The event handling mechanisms for the "Check quota" event listener are implemented by programmatic mechanism "oracle.ifs.category". Such programmatic mechanisms may be instances of Java classes and/or PL/SQL packages, for example.

Each resource configuration may be associated with the entire file hierarchy, or with a specified node of the hierarchy. For example, the resource configuration shown above might be associated with directory 116. If so, then whenever a file system event was going to occur relative to directory 116, the "Category application" and "Check quota" event listeners both would be inspected to determine whether any of those event listeners' event handlers corresponded to the event type of the file system event that was going to occur relative to directory 116. For another example, the resource configuration shown above might be associated with the entire file hierarchy. If so, then whenever a file system event was going to occur relative to any node in the file hierarchy, the "Category application" and "Check quota" event listeners both would be inspected to determine whether any of those event listeners' event handlers corresponded to the event type of the file system event that was going to occur relative to that node.

Event Handlers

Each listener element also has an "events" child element. Each such "events" element may contain one or more additional child elements. Each of these child elements corresponds to a separate event handler. For example, in the resource configuration shown above, each event listener has event handlers for "Post-LinkIn," "Post-UnlinkIn," and "Post-Update" file system events; these are bounded by the "<events>" and "</events>" opening and closing tags. Each of these event handlers corresponds to a file system event type.

According to one embodiment, whenever a file system event of a particular file system event type is going to occur relative to a particular node in the file hierarchy, the following steps are performed. First, each of the event listeners in the resource configuration associated with the entire file hierarchy is inspected to determine if any of those event listeners contains an event handler that corresponds to the particular file system event type. Event handlers that correspond to the particular file system event type are added to a list of event handlers that are to be invoked. The event handlers are placed in the list in the same order as the order of their event listeners in the resource configuration. Thus, event listeners that occur earlier in a resource configuration have precedence over event listeners that occur later in a resource configuration.

Next, each of the event listeners in the resource configuration associated with the particular node are inspected to determine if any of those event listeners contains an event handler that corresponds to the particular file system event type. Event handlers that correspond to the particular file system event type are added to the list of event handlers that are to be invoked. The event handlers are placed beneath any other event handlers that are already in the list. Thus, event handlers that occur in a resource configuration that is associated with the entire file hierarchy have precedence over event listeners that occur in a resource configuration that is associated with the particular node.

In one embodiment, the addition of a particular event handler to the list of event handlers that are to be invoked is subject to the satisfaction of a specified pre-condition that is contained in the particular event handler's event listener. Preconditions are described further below.

Usually, after the list of event handlers to be invoked has been completely generated, the event handlers in the list are invoked, one at a time, according to the order in which those event handlers occur in the list. However, the placement of a particular event handler within the list does not necessarily guarantee that the particular event handler actually will be invoked, or that the particular event handler will be invoked according to its initial order in the list; event handlers may be removed from the list and/or reordered within the list. Circumstances under which this might occur are described further below.

When an event handler is invoked, a corresponding method or procedure of the event handler's event listener's corresponding programmatic mechanism is called and executed. For example, when the "Post-LinkIn" event handler of the "Category application" event listener is invoked, a "Post-LinkIn" method or procedure of the "oracle.cm.category" programmatic mechanism is called and executed. For another example, when the "Post-LinkIn" event handler of the "Check quota" event listener is invoked, a "Post-LinkIn" method or procedure of the "oracle.ifs.category" programmatic mechanism is invoked. For yet another example, when the "Post-Update" event handler of the "Category application" event listener is invoked, a "Post-Update" method or procedure of the "oracle.cm.category" programmatic mechanism is called and executed. Each such method or procedure may perform customized, user-specified actions when invoked.

Event Types

As is described above, each event handler corresponds to a file system event type. In one embodiment, the following file system event types are among those recognized: render, create, delete, update, lock, unlock, link in, link to, unlink in, unlink from, check in, check out, uncheck out, version control, inconsistent update, and open.

In the resource configuration shown above, both event listeners contain event handlers that correspond to the "link in", "unlink in", and "update" file system event types. Event handlers for a particular file system event type may be prefaced by "pre-" or "post-" prefixes. The "pre-" and "post-" prefixes are discussed further below.

A file system event of the "render" file system event type occurs when the contents of a node are dynamically generated.

A file system event of the "create" file system event type occurs when a node is created in the file hierarchy. Conversely, a file system event of the "delete" file system event type occurs when a node is deleted from the file hierarchy.

A file system event of the "lock" file system event type occurs when a node is placed in a state in which one or more entities are prevented from reading from and/or writing to a node. Conversely, a file system event of the "unlock" file system event type occurs when a node that had been placed in such a state is placed in a state in which the entities that were prevented from reading from and/or writing to the node are allowed to read from and/or write to the node.

A file system event of the "link in" file system event type occurs when a symbolic link is created in the file hierarchy. Conversely, a file system event of the "unlink in" file system event type occurs when a symbolic link is removed from the file hierarchy. A symbolic link is a pointer or reference to a node. A symbolic link may occur at a different location in the file hierarchy than the node and may have a different name than the node. For example, referring to FIG. 1, a symbolic link created as a child of directory 120 may refer to document 122. For another example, a symbolic link created as a child of directory 126 may refer to directory 116. Accessing such a symbolic link is equivalent to accessing the target node to which the symbolic link refers. If a symbolic link to document 122 was created as a child of directory 120, then document 122 would appear to be a child of directory 120 as well as a child of directory 124. If a symbolic link to directory 116 was created as a child of directory 126, then directory 116 would appear to be a child of directory 126 as well as a child of directory 114.

The creation and removal of symbolic links in and from the file hierarchy constitute file system events that are distinct from the association and disassociation of such symbolic link with and from target nodes in the file hierarchy. Thus, a file system event of the "link to" file system event type occurs when an existing, already created, symbolic link is associated with a target node in the file hierarchy. Conversely, a file system event of the "unlink to" file system event type occurs when an existing symbolic link is disassociated from a node with which the symbolic link had been associated. Because a user might want different actions to be performed upon occurrences of each of the "link in," "link to," "unlink in," and "unlink to" file system event types, these file system event types are distinguished and separated accordingly, even though a "link to" type file system event typically accompanies a "link in" type file system event, and an "unlink to" type file system event typically accompanies an "unlink in" type file system event.

A file system event of the "check out" file system event type occurs when an entity causes a modifiable copy of an unchangeable version-controlled node to be created while preserving the original node in its unchangeable state. Conversely, a file system event of the "check in" file system event type occurs when an entity causes such a copy (with some modification) to become a new unchangeable version-controlled node in the file hierarchy—another "version" of the node that is accessible to other entities after being "checked in." Alternatively, an "uncheck out" file system event type occurs when such a copy is disposed of without ever being "checked in."

A file system event of the "version control" file system event type occurs when a node is placed under version control and given a version-controlled status, so that the node becomes an unchangeable version-controlled node from which modifiable copies may be made as described above. Some nodes may be under version control, while other nodes might not be.

In some file systems, nodes may be updated transactionally, so that incremental changes made to the node do not become permanent unless and until all of the incremental changes that belong to a transaction have been completed and committed—if any of the incremental changes of a transaction fails, then none of the transaction's changes are made permanent. A file system event of the "inconsistent update" file system event type occurs when such an incremental update is performed, even if the transaction to which the incremental update belongs has not yet been committed.

A file system event of the "open" file system event type occurs when an object handle or buffer for a node is established so that the node can be read from and/or written to via the object handle or buffer. Thus, a file system event of the "open" file system event type may occur prior to the node actually being read from or written to.

Pre- and Post-Event Handler Prefixes

As is described above, each event handler may be prefixed by "pre-" or "post-" prefix. In one embodiment, such prefixes affect the programmatic method or procedure to which an event handler corresponds, and also the timing of the calling and execution of the programmatic method or procedure relative to a file system event's occurrence. For example, a particular programmatic mechanism may contain one programmatic method or procedure for the "pre-update" event handler and another programmatic method or procedure for the "post-update" event handler. However, both the "pre-update" event handler and the "post-update" event handler correspond to the "update" file system event type.

As is described above, when a file system event is going to occur relative to a node in a file hierarchy, a list of event handlers to be invoked is been generated. According to one embodiment, those of the list's event handlers that are prefixed by "pre-" are invoked before the actual event occurs. After the file system event occurs, then those of the list's event handlers that are prefixed by "post-" are invoked.

For example, based on the example resource configuration shown above, in response to detecting that a node was going to be updated, the "post-update" method or procedure of the "oracle.cm.category" programmatic mechanism would be called and executed after the node was updated, and then the "post-update" method or procedure of the "oracle.ifs.category" programmatic mechanism would be called and executed. Alternatively, if the event handlers had been prefixed by "pre-" instead of "post-", then the "pre-update" methods or procedures of both the "oracle.cm.category" and the "oracle.ifs.category" programmatic mechanisms would have been called and executed before the node was updated.

Pre-Conditions

As is discussed above, in one embodiment, the addition of a particular event handler to the list of event handlers that are to be invoked is subject to the satisfaction of a specified pre-condition that is contained in the particular event handler's event listener. In one embodiment, before an event handler is added to the list of event handlers to be invoked, as described above, it is determined whether that event handler's event listener's pre-condition is satisfied. If the pre-condition is not satisfied, then the event handler is not added to the list.

In the example resource configuration shown above, the "Category application" and "Check quota" event listeners both contain pre-conditions, which are bounded by the "<pre-condition>" and "</pre-condition>" opening and closing tags. In the above example, both pre-conditions contain "existsNode" elements. Each "existsNode" element contains an expression that indicates a node or node type. In the above example, the nodes and node types are indicated via an XPath expression. When a pre-condition contains an "existsNode" element, it is determined whether the node or node type indicated within the "existsNode" element exists at the specified location in the file hierarchy. The pre-condition is satisfied only if the node or node type exists at the specified location. This is just one example of many different possible pre-conditions; other pre-conditions may contain expressions that do not involve the existence of a node or node type.

Event Handlers Altering the Invocation of Event Handlers

As is discussed above, the placement of a particular event handler within the list does not necessarily guarantee that the particular event handler actually will be invoked, or that the particular event handler will be invoked according to its initial order in the list. In one embodiment, when a file system event is going to occur relative to a node in a file hierarchy, an "event object" is created for that file system event. The event object contains the ordered list of event handlers that are to be invoked, as described above. The event object also comprises an interface of invocable methods or procedures that allow the list contained within the event object to be retrieved and altered.

In one embodiment, when the next event handler in the list is invoked, the event object is passed as a parameter to the event handler's corresponding programmatic method or procedure. The programmatic method or procedure may use the event object's interface to read the list and/or modify the list in accordance with user-specified logic within the programmatic method or procedure. For example, the programmatic method or procedure may re-order the event handlers that remain in the list. For another example, the programmatic method or procedure may remove one or more remaining event handlers from the list. Thus, event handlers may be removed from and/or reordered within the list by preceding event handlers regardless of the list's original ordering and composition.

When the programmatic method or procedure has finished executing, it returns the event object, which may contain a modified list of event handlers to be invoked. The next event handler in the list, if any, is then invoked.

Database Architecture

Figure 4:
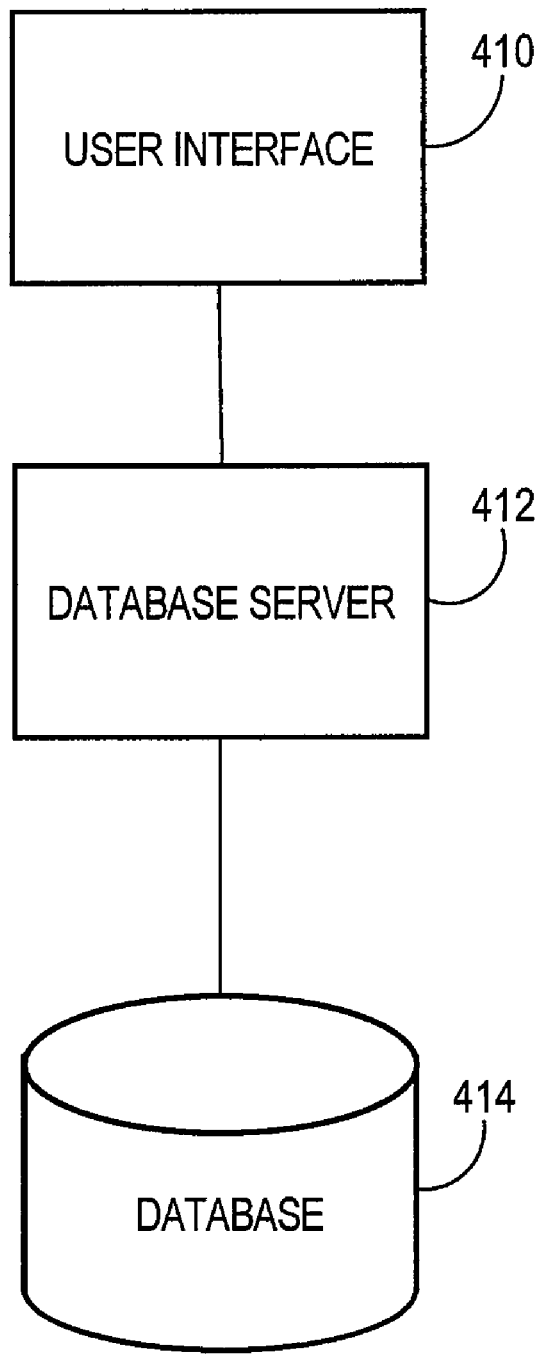
FIG. 4 is a block diagram illustrating a database system that may be used to implement one embodiment of the invention.

FIG. 4 is a block diagram showing a database architecture that may be used to implement an embodiment of the present invention. The architecture comprises a user interface 410, a database server 412, and a database 414. Database server 412 interacts with the user via user interface 410, and accesses and maintains database 414 in accordance with the user input. Database server 412 may also interact with other systems (not shown).

In general, database server 412 creates a database by organizing information in one or more tables. The organization of the table is referred to as a definition. An index is a structure that is used for accessing particular information in the table more quickly. Therefore, a table definition supports any access mechanism to the data (search by name, by ID, by date, etc.), whereas an index is designed for a specific access method. The index itself is generally not the authoritative source of the data, but rather contains pointers to the disk addresses of the tables storing the authoritative data.

Figure 5A:
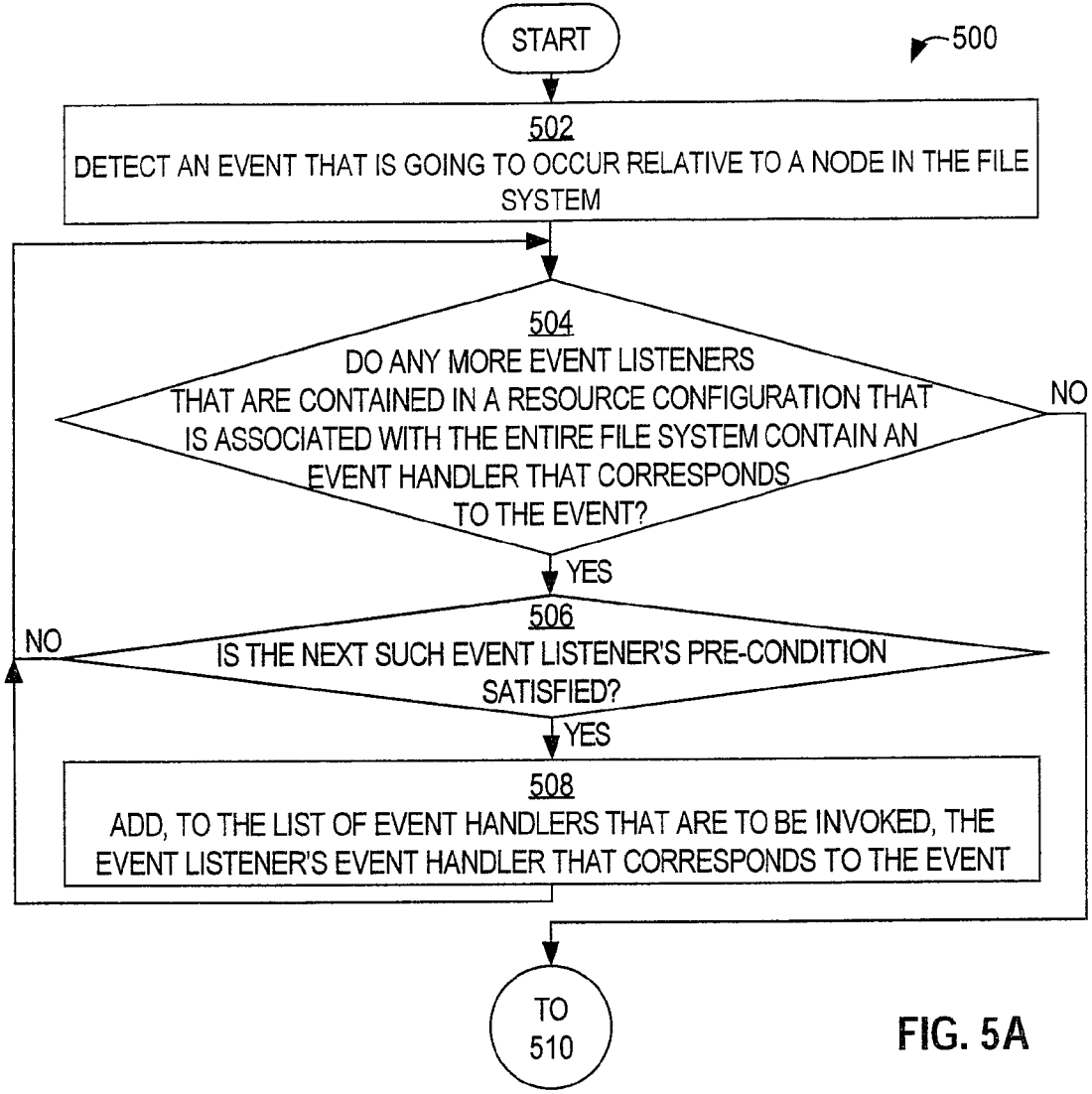

Example Technique for Performing an Action in Response to a File System Event FIGS. 5A-C show a flow diagram that illustrates a technique 500, according to an embodiment of the invention, for performing an action in response to a file system event. Database server 412 may perform technique 500, for example. Prior to the performance of technique 500, associations between resource configurations and nodes in a file system hierarchy may be established. Actions that are performed by event handlers that are contained in a resource configuration are considered to be associated with the same node with which the resource configuration is associated. Pre-conditions that are contained in an event listener are considered to be associated with the actions that are performed by event handlers that are contained in the event listener.

Referring first to FIG. 5A, in block 502, a file system event that is going to occur relative to a node within the file system is detected. In block 504, it is determined whether any more event listeners that are contained in a resource configuration that is associated with the entire file system contain an event handler that corresponds to the file system event. If so, then control passes to block 506. Otherwise, control passes to block 510 of FIG. 5B.

In block 506, it is determined whether the next such event listener's pre-condition is satisfied. If so, then control passes to block 508. Otherwise, control passes back to block 504.

In block 508, the event listener's event handler that corresponds to the file system event is added to the list of event handlers that are to be invoked. Control passes back to block 504.

Referring now to FIG. 5B, in block 510, it is determined whether any more event listeners that are contained in a resource configuration that is associated with the node contain an event handler that corresponds to the file system event. If so, then control passes to block 512. Otherwise, control passes to block 516.

In block 512, it is determined whether the next such event listener's pre-condition is satisfied. If so, then control passes to block 514. Otherwise, control passes back to block 510.

In block 514, the event listener's event handler that corresponds to the file system event is added to the list of event handlers that are to be invoked. Control passes back to block 510.

In block 516, an event object that contains the list of event handlers that are to be invoked is created.

Referring now to FIG. 5C, in block 518, prior to the occurrence of the file system event, it is determined whether any more event handlers that are prefaced by "pre-" are contained in the event object's list of event handlers to be invoked. If so, then control passes to block 520. Otherwise, control passes to block 524.

In block 520, the event object is passed as a parameter in a call to a programmatic method or procedure that corresponds to the next such event handler in the list. The programmatic method or procedure called is a programmatic method or procedure of the programmatic mechanism that corresponds to the event handler's event listener. The programmatic method or procedure may perform one or more user-specified actions. Such actions may include modifying the event object's list of event handlers to be invoked.

In block 522, the event object is received from the programmatic method or procedure. Control passes back to block 518.

In block 524, the file system event is allowed to occur.

In block 526, after the occurrence of the file system event, it is determined whether any more event handlers that are prefaced by "post-" are contained in the event object's list of event handlers to be invoked. If so, then control passes to block 528. Otherwise, the execution of technique 500 ends.

In block 528, the event object is passed as a parameter in a call to a programmatic method or procedure that corresponds to the next such event handler in the list. The programmatic method or procedure called is a programmatic method or procedure of the programmatic mechanism that corresponds to the event handler's event listener. The programmatic method or procedure may perform one or more user-specified actions. Such actions may include modifying the event object's list of event handlers to be invoked.

In block 530, the event object is received from the programmatic method or procedure. Control passes back to block 526.

Hardware Overview

Figure 6:
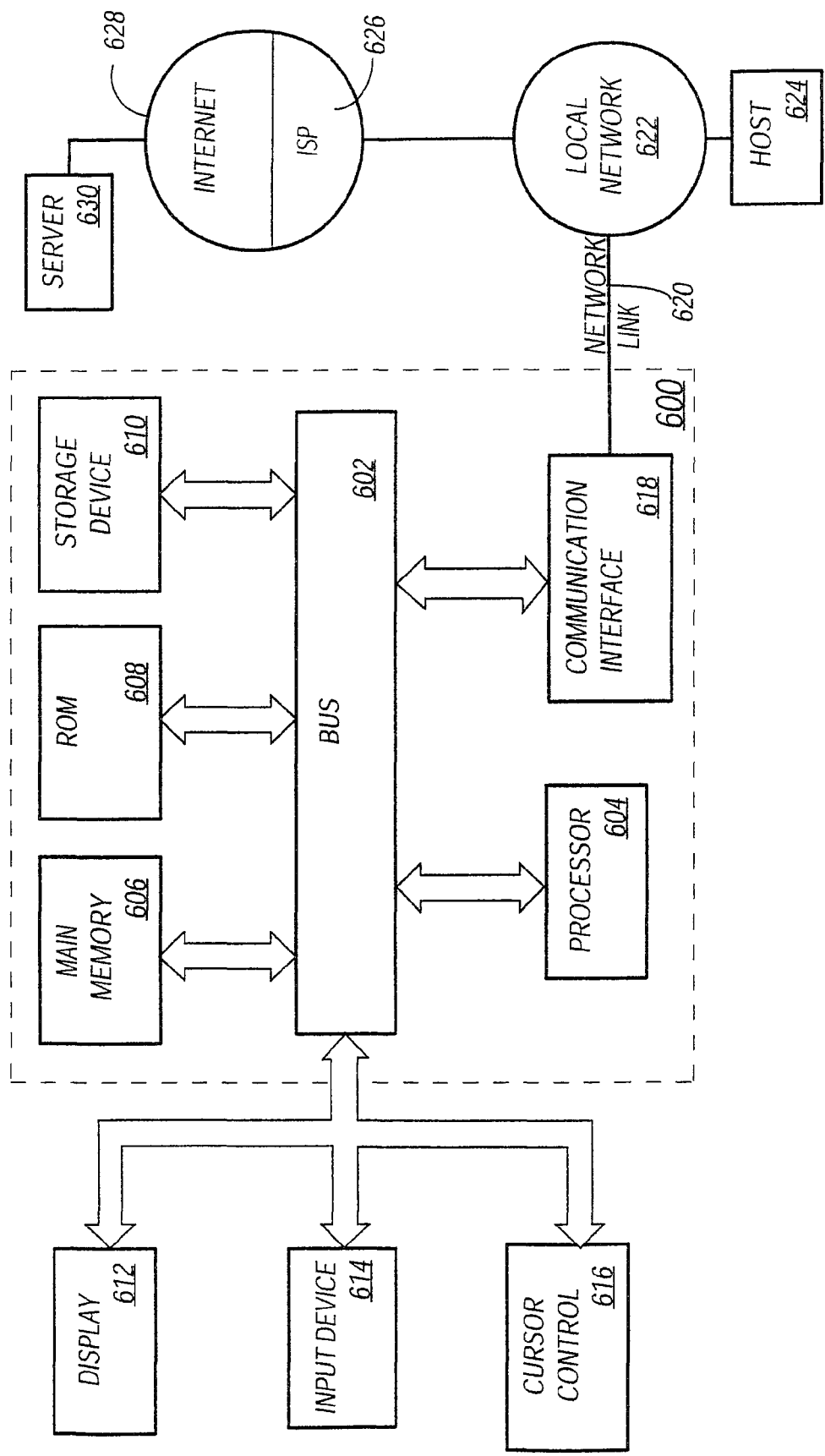
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    storing a first event handler that specifies a first method to be performed prior to an occurrence of a file system event of a first event type relative to one or more nodes in a file system, wherein execution of the first method causes a first action to be performed on a first database object;

storing a second event handler that specifies a second method to be performed after an occurrence of a file system event of the first event type relative to the one or more nodes in the file system, wherein execution of the second method causes a second action to be performed on a second database object;

storing one or more event handlers other than the first event handler and the second event handler, wherein the one or more other event handlers correspond to one or more event types other than the first event type;

a server detecting that execution of a received file system command will cause a particular file system event of the first event type relative to the one or more nodes in the file system;

in response to the server detecting that the received file system command will cause the particular file system event of the first event type relative to the one or more nodes in the file system: (a) the server adding the particular file system event to a list of file system events to occur, and (b) the server invoking the first method prior to the occurrence of the particular file system event; and in response to and after the occurrence of the particular file system event, the server invoking the second method;

wherein the first and second actions differ from the particular file system event;

wherein the first event handler, the second event handler, and the one or more other event handlers are stored in a configuration file, and wherein the configuration file contains an indication of whether a method corresponding to an event identifier is to be performed before or after the occurrence of a file system event;

wherein the method is performed by one or more computing devices.

2. The method of claim 1, wherein a database server manages the file system.

3. The method of claim 1, wherein the configuration file is an extensible markup language (XML) file, and wherein the XML file contains a first tag that indicates "pre" before a particular event identifier to indicate that the first method is to be performed before the occurrence of a file system event that corresponds to the particular event identifier, and wherein the XML file contains a second tag that indicates "post" before the particular event identifier to indicate that the second method is to be performed after the occurrence of a file system event that corresponds to the particular event identifier.

4. One or more non-transitory computer-readable storage media storing instructions which, when executed by one or more processors, cause the one of more processors to perform the steps of:

storing a first event handler that specifies a first method to be performed prior to an occurrence of a file system event of a first event type relative to one or more nodes in a file system, wherein execution of the first method causes a first action to be performed on a first database object;

storing a second event handler that specifies a second method to be performed after an occurrence of a file system event of the first event type relative to the one or more nodes in the file system, wherein execution of the second method causes a second action to be performed on a second database object;

storing one or more event handlers other than the first event handler and the second event handler, wherein the one or more other event handlers correspond to one or more event types other than the first event type;

a server detecting that execution of a received file system command will cause a particular file system event of the first event type relative to the one or more nodes in the file system;

in response to the server detecting that the received file system command will cause the particular file system event of the first event type relative to the one or more nodes in the file system: (a) the server adding the particular file system event to a list of file system events to occur, and (b) the server invoking the first method prior to the occurrence of the particular file system event; and in response to and after the occurrence of the particular file system event, the server invoking the second method;

wherein the first event handler, the second event handler, and the one or more other event handlers are stored in a configuration file, and wherein the configuration file contains an indication of whether a method corresponding to an event identifier is to be performed before or after the occurrence of a file system event;

wherein the first and second actions differ from the particular file system event.

5. The one or more non-transitory computer-readable storage media of claim 4, wherein a database server manages the file system.

6. The one or more non-transitory computer-readable storage media of claim 4, wherein the configuration file is an extensible markup language (XML) file, and wherein the XML file contains a first tag that indicates "pre" before a particular event identifier to indicate that the first method is to be performed before the occurrence of a file system event that corresponds to the particular event identifier, and wherein the XML file contains a second tag that indicates "post" before the particular event identifier to indicate that the second method is to be performed after the occurrence of a file system event that corresponds to the particular event identifier.

7. The method of claim 1, wherein the first database object stores information about the one or more nodes.

8. The method of claim 1, wherein the second database object stores information about the one or more nodes.

9. The method of claim 1, wherein the file system event is an event that occurs when a node of the one or more nodes is locked or unlocked.

10. The method of claim 1, wherein the file system event is an event that occurs when a node of the one or more nodes is dynamically generated.

11. The method of claim 1, wherein the file system event is an event that occurs when a symbolic link to a node of the one or more nodes is established or destroyed.

12. The one or more non-transitory computer-readable storage media of claim 4, wherein the first database object stores information about the one or more nodes.

13. The one or more non-transitory computer-readable storage media of claim 4, wherein the second database object stores information about the one or more nodes.

14. The one or more non-transitory computer-readable storage media of claim 4, wherein the file system event is an event that occurs when a node of the one or more nodes is locked or unlocked.

15. The one or more non-transitory computer-readable storage media of claim 4, wherein the file system event is an event that occurs when a node of the one or more nodes is dynamically generated.

16. The one or more non-transitory computer-readable storage media of claim 4, wherein the file system event is an event that occurs when a symbolic link to a node of the one or more nodes is established or destroyed.

17. The method of claim 1, wherein the first event type is one of: render, create, delete, update, lock, unlock, link in, link to, unlink in, unlink from, check in, check out, uncheck out, version control, inconsistent update, or open; and wherein the one or more other event types include one or more others of: render, create, delete, update, lock, unlock, link in, link to, unlink in, unlink from, check in, check out, uncheck out, version control, inconsistent update, or open.

18. The method of claim 1, wherein the received file system command is one of: a command to copy files, a command to move files, a command to delete files, a command to create directories, a command to list directory contents, a command to remove directories, a command to rename files, or a command to rename directories.

19. The one or more non-transitory computer-readable storage media of claim 4, wherein the first event type is one of: render, create, delete, update, lock, unlock, link in, link to, unlink in, unlink from, check in, check out, uncheck out, version control, inconsistent update, or open; and wherein the one or more other event types include one or more others of: render, create, delete, update, lock, unlock, link in, link to, unlink in, unlink from, check in, check out, uncheck out, version control, inconsistent update, or open.

20. The one or more non-transitory computer-readable storage media of claim 4, wherein the received file system command is one of: a command to copy files, a command to move files, a command to delete files, a command to create directories, a command to list directory contents, a command to remove directories, a command to rename files, or a command to rename directories.

* * * * *

UNITED STATES PATENT AND TRADEMARK OFFICE
CERTIFICATE OF CORRECTION

PATENT NO.         : 8,176,007 B2                                    Page 1 of 1
APPLICATION NO.    : 13/026131
DATED              : May 8, 2012
INVENTOR(S)        : Hoang et al.

It is certified that error appears in the above-identified patent and that said Letters Patent is hereby corrected as shown below:

On Title page 3, Item (56) under "Other Publications", line 25, delete "PCT/US03/355551," and insert -- PCT/US03/35551, --, therefor.

On Title page 3, Item (56) under "Other Publications", line 47, delete "(7 pages)." and insert -- received on Oct. 13, 2006, (7 pages). --, therefor.

On Title page 3, Item (56) under "Other Publications", line 52, delete "US2005,011763," and insert -- US2005/011763, --, therefor.

On Title page 4, Item (56) under "Other Publications", line 8, delete "US205/011762." and insert -- US2005/011762, --, therefor.

On Title page 4, Item (56) under "Other Publications", line 23, delete ""Milau:" and insert -- "Millau: --, therefor.

On Title page 4, Item (56) under "Other Publications", line 11, delete "600202/2000." and insert -- 600202/2000, received Apr. 28, 2008 (9 pages). --, therefor.

In column 1, line 26, delete "2003;" and insert -- 2002; --, therefor.

Signed and Sealed this
Thirty-first Day of July, 2012

David J. Kappos
*Director of the United States Patent and Trademark Office*